3,485,850
3α,7α-DI-SUBSTITUTED-INDANES
Eugene R. Wagner, Zionsville, Ind., assignor to The Dow Chemical Company, Midland, Mich., a corporation of Delaware
No Drawing. Filed May 15, 1967, Ser. No. 638,563
Int. Cl. C07d 27/52; A61k 27/00
U.S. Cl. 260—326                                   3 Claims

ABSTRACT OF THE DISCLOSURE

The new compounds, 4,7-dihydro-3a-cyano-7a-indanecarboxylic acid and the lower alkyl esters thereof, 4,7-dihydro-3a,7a-indanedicarboximide and N-alkyl-4,7-dihydro-3a,7a-indanedicarboximide, and a method for their preparation. The novel indanecarboximides have anticonvulsant activity and the novel indanecarboxylic acid esters are useful intermediates in the preparation of the indanecarboximides.

---

This invention is concerned with di-substituted-indanes and is particularly directed to 4,7-dihydro-3a-cyano-7a-indanecarboxylic acid and lower alkyl esters thereof and to N-substituted-4,7-dihydro-3a,7a-indanedicarboximides corresponding to the formula:

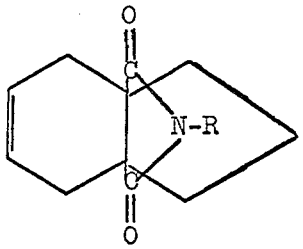

I

In the present specification and claims, R represents hydrogen, methyl or ethyl and lower alkyl refers to methyl and ethyl. The novel indanecarboxylic acid and its esters are oily liquids which are soluble in organic solvents such as acetone and alcohols. The novel N-substituted-indanedicarboximides are crystalline solids which are soluble in a variety of organic solvents such as benzene and acetone and which are slightly soluble in water.

4,7-dihydro-3a-cyano-7a-indanecarboxylic acid and its lower alkyl esters are valuable intermediates in the preparation of the novel N-substituted-indanedicarboximides. The novel N-substituted-indanedicarboximides have been found to be useful for administration to laboratory animals in studying drug effects on the central and peripheral nervous system. They have been found to be particularly useful as anticonvulsants.

4,7-dihydro-3a-cyano-7a-indanecarboxylic acid and the lower alkyl esters thereof are prepared by the reaction of 2-cyanocyclopentene-1-carboxylic acid or an ester thereof corresponding to Formula II wherein A represents hydrogen, methyl or ethyl, with an excess of 1,3-butadiene. The reaction proceeds with production of a 4,7-dihydro-3a-cyano-7a-indanecarboxylic acid ester corresponding to Formula III wherein A represents the groups described with respect to Formula II.

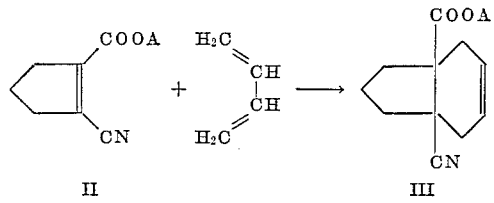

The novel N-substituted-indanedicarboximide corresponding to Formula I when R is hydrogen is prepared by cyclization of an indanecarboxylic acid ester intermediate corresponding to Formula III to produce 4,7-dihydro-3a,7a-indanedicarboximide. The N-alkyl-substituted-indanedicarboximides are prepared by the reaction of 4,7-dihydro-3a,7a-indanedicarboximide with an excess of ethereal diazomethane or diazoethane.

The reaction of the 2-cyanocyclopentene-1-carboxylic acid ester with butadiene proceeds when the reactants are contacted and mixed and heated to a temperature of from about 150° to 180° C. The reaction is preferably carried out at a temperature of about 175° C. under pressure in a bomb. The reaction mixture is held for about 20 to about 24 hours at a temperature within the reaction temperature range, after which it is cooled to room temperature. The 4,7-dihydro-3a-cyano - 7a - indanedicarboxylic acid ester can be separated from the reaction mixture by conventional methods such as by mixing the reaction mixture with an organic solvent, filtering the resulting mixture and evaporating the filtrate. The intermediate can be purified by conventional procedures such as fractional distillation.

The N-substituted-indanedicarboximide corresponding to Formula I wherein R is hydrogen is prepared by the cyclization of the above-described intermediate in excess glacial acetic acid and concentrated hydrochloric acid. The reaction proceeds when the indanecarboxylic acid intermediate and the acids are mixed and heated at a temperature from about 80° to 100° C., and preferably at about 100° C. The reaction mixture is held at a temperature within the reaction temperature range for about 2 to 3 hours. The product separates from the reaction mixture as an insoluble oil which crystallizes on standing. The product can be purified by such conventional procedures as recrystallization and washing.

The N-alkyl-substituted-indanedicarboximides are prepared by the reaction of 4,7-dihydro-3a,7a-indanedicarboximide with excess diazomethane or diazoethane in ether solution. The reaction proceeds when the reactants are contacted and mixed, preferably at a temperature from 0° to 25° C. for a period of about 0.5 to 1 hour. The N-alkyl-substituted-indanedicarboximide product can be separated from the reaction mixture by such conventional procedures as evaporation or distillation to remove the solvents. The product can be purified by conventional procedures such as recrystallization.

In the preparation of the 4,7-dihydro - 3a - cyano - 7a-indanecarboxylic acid esters of the invention, a 2-cyanocyclopentene-1-carboxylic acid ester is mixed with butadiene and the mixture is heated in a bomb to a temperature within the reaction temperature range for about one day. In a convenient procedure, a mixture of the methyl and ethyl esters of 2-cyanocyclopentene-1-carboxylic acid is employed, and the product is obtained as a mixture of the methyl and ethyl esters. The mixture of esters can be employed as an intermediate in preparing 4,7-dihydro-3a,7a-indanedicarboximide. The exact proportions of the reactants are not cricitical, some of the desired 4,7-dihydro-3a-cyano - 7a - indanecarboxylic acid ester being formed when the reactants are mixed together in any proportions. However, the reaction consumes the reactants in equimolar proportions and in the preferred procedure, an excess of 1,3-butadiene is employed. The 4,7-dihydro-3a-cyano-7a-indanecarboxylic acid ester is conveniently separated from the reaction mixture by mixing the reaction mixture with an organic solvent such as acetone or alcohol, filtering the mixture and evaporating the filtrate in vacuo to leave the above-named product as a residue. The product can be purified by conventional means such as distillation.

In the prepartion of 4,7-dihydro - 3a,7a - indanedicarboximide, a 4,7-dihydro-3a-cyano - 7a - indanecarboxylic acid ester is mixed with glacial acetic acid and concentrated hydrochloric acid and the mixture is heated at a temperature within the reaction temperature range. The product is separated from the reaction mixture by the addition of water to separate the product as a water-insoluble oil. The product is conveniently separated by conventional procedures such as decantation. The 4,7-dihydro-3a,7a-indanedicarboximide product crystallizes on standing and can be purified by recrystallization from chlorinated organic solvents such as carbon tetrachloride or chloroform.

In the preparation of the N-alkyl - substituted - indanedicarboximides, 4,7-dihydro-3a,7a-indanedicarboximide is mixed with a solution of diazomethane or diazoethane in ether. The mixture is held at a temperature in the reaction temperature range, conveniently at room temperature. The product is conveniently separated by evaporation in vacuo. The product can be purified by recrystallization from organic solvents such as petroleum ether.

The following examples illustrate the invention but are not to be construed as limiting the same.

EXAMPLE 1

One hundred grams of a mixture of the methyl and ethyl esters of 2-cyanocyclopentene-1-carboxylic acid were mixed together with 250 milliliters of butadiene and the resulting mixture was heated at 175° C. in a bomb for 22 hours. The mixture was cooled and poured into about 8 liters of acetone to make a cloudy solution. The cloudy solution was filtered and the filtrate was evaporated in vacuo to leave a dark oily residue. The residue was mixed with about 2 liters of ethanol and the mixture was filtered. The clear yellow filtrate was evaporated in vacuo and the residue was distilled. The product was obtained as a mixture of the methyl and ethyl esters of 4,7-dihydro-3a-cyano-7a-indanecarboxylic acid and was collected as a fraction boiling at 115°–125° C. under a pressure of 0.6 millimeter of mercury. The structure of the product was confirmed by infrared spectroscopy.

EXAMPLE 2

Five grams of the 4,7-dihydro-3a-cyano-7a-indanecarboxylic acid ester product of Example 1 were mixed with 25 milliliters of glacial acetic acid and 25 milliliters of concentrated hydrochloric acid and the mixture was heated on a steam bath for about two hours. The reaction mixture was cooled and poured into about 250 milliliters of water, whereupon an oily layer separated. The oily layer was collected, extracted with three 50-milliliter portions of water and dried over anhydrous sodium sulfate. The dried oil was evaporated in vacuo and was found to partially crystallize on standing. The 4,7-dihydro-3a,7a-indanedicarboximide product was recrystallized from carbon tetrachloride three times and found to melt at 162°–164° C. The product was found by analysis to have carbon, hydrogen and nitrogen contents of 68.71, 6.87 and 7.14 percent, respectively, as compared with the theoretical contents of 69.09, 6.85 and 7.33 percent, respectively, calculated for the named structure. The structure of the product was confirmed by infrared spectroscopy and nuclear magnetic resonance analysis.

EXAMPLE 3

166 milligrams of the 4,7-dihydro-3a,7a-indanedicarboximide of Example 2 were mixed with an excess of diazomethane dissolved in ether. The mixture was evaporated in vacuo to leave the product as a residue. The 4,7-dihydro-N-methyl-3a,7a-indanedicarboximide product was crystallized from petroleum ether and found to melt at 84°–87° C. The structure of the product was confirmed by infrared spectroscopy.

In substantially the same procedure, 4,7-dihydro-N-ethyl - 3a,7a - indanedicarboximide, having a molecular weight of 219, is prepared by mixing 4,7-dihydro-3a,7a-indanedicarboximide with excess ethereal diazoethane and evaporating the mixture in vacuo to obtain the product as a residue.

The N-substituted-indanedicarboximides of the invention are useful as anticonvulsants. In representative operations, groups of mice were administered 4,7-dihydro-3a,7a-indanedicarboximide by intraperitoneal injection to provide the named compound at a dosage rate of 50 milligrams per kilogram. Thirty minutes following the injection of the named compound, the mice were administered Metrazol (pentamethylenetetrazole) by subcutaneous injection at a dosage rate of 85 milligrams per kilogram. The subcutaneous injection of 85 milligrams per kilogram of Metrazol normally results in violent clonic convulsions in the mice followed by death within about one hour. None of the mice treated with 4,7-dihydro-3a,7a-indanedicarboximide were observed to exhibit convulsions and all of the mice so treated survived. In other operations, the dose of 4,7-dihydro-3a,7a-indnaedicarboximide effective to prevent Metrazol-induced convulsions in 50 percent of the mice ($ED_{50}$) was calculated to be 46 milligrams per kilogram. A similar effect has been observed when known anticonvulsant drugs are employed, Everett et al., J. Pharmacol, Exptl. Ther., 81:402 (1944) and Goodman et al., J. Pharmacol. Exptl. Ther., 108:428 (1953).

I claim:

1. An N-substituted-4,7-dihydro-3a,7a-indanedicarboximide compound corresponding to the formula

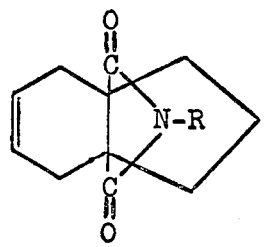

wherein R represents hydrogen, methyl or ethyl.

2. The compound of claim 1 wherein R represents hydrogen.

3. The compound of claim 1 wherein R represents methyl.

References Cited

Altman et al.: Tetrahedron, Supp. No. 8, Part I, December 1966, pp. 279, 286–87, 302.

ALEX MAZEL, Primary Examiner

J. A. NARCAVAGE, Assistant Examiner

U.S. Cl. X.R.
260—464; 424—274